June 9, 1964     T. E. EATON ETAL     3,136,953
DISCRIMINATOR SYSTEM AND CIRCUITS
Filed Feb. 14, 1961     3 Sheets-Sheet 1

INVENTORS
THOMAS E. EATON
BY THADDEUS F. BOBLAK
Attorneys

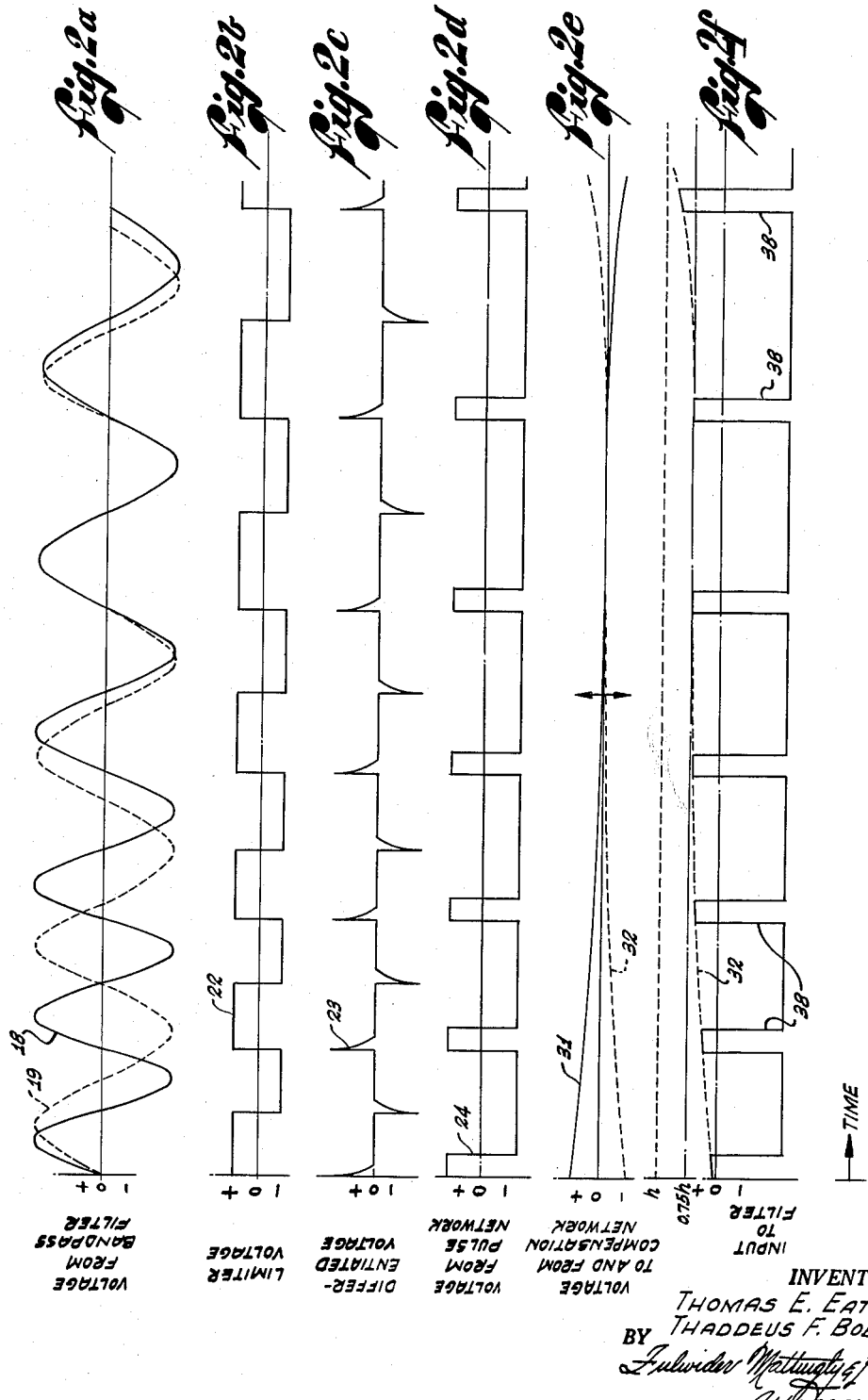

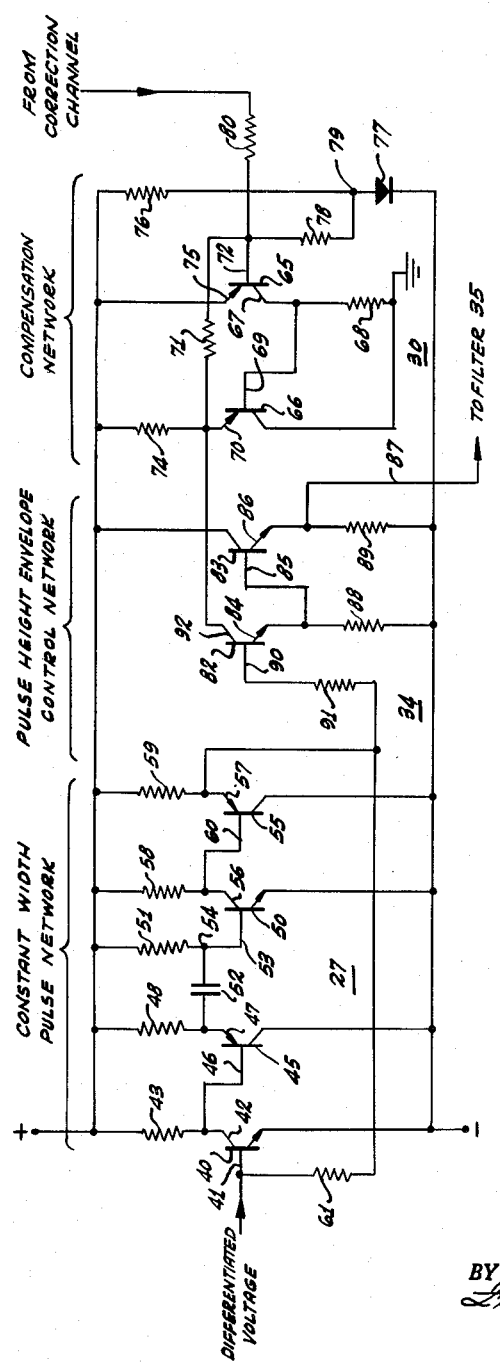

United States Patent Office 3,136,953
Patented June 9, 1964

3,136,953
DISCRIMINATOR SYSTEM AND CIRCUITS
Thomas E. Eaton, Hawthorne, and Thaddeus F. Boblak, San Pedro, Calif., assignors, by mesne assignments, to Air Logistics Corporation, Pasadena, Calif., a corporation of California
Filed Feb. 14, 1961, Ser. No. 89,184
9 Claims. (Cl. 329—126)

This invention relates to frequency discriminator systems and circuits, and more particularly to unique miniaturized apparatus to produce, from signals recorded on magnetic tape, faithful indications of the signals without distortion due to operation of the tape recording and reproducing apparatus.

In FM/FM radio transmitting and receiving systems, it is common practice to record the received composite signals on magnetic tape, in addition to establishing instantaneous indications of the components of the received signals. In this manner, a permanent record of the received signals is obtained for subsequent reproduction to permit a more careful study of the information represented by the components of the received signals.

Typically, the signals reproduced from the magnetic tape are fed to a bank of discriminators, each of which is adapted to pass a respective sub-carrier making up the composite signal. However, due to tape inaccuracies, and to mechanical inaccuracies of the recording and playback devices, the reproduced signals vary in frequency with respect to the signals originally received. Such frequency variations are commonly referred to as "wow and flutter."

Compensation for "wow and flutter" is effected through a reference signal, which is a precisely controlled constant frequency signal recorded along with the received signals. Since this reference signal also is subjected to frequency shifts because of "wow and flutter," any difference between the frequency of the reproduced reference signal and the known frequency corresponds to the frequency variations to which the received signal components are subjected.

In systems as above described, the outputs of the respective discriminators are in the form of voltage pulses, which are averaged in an output circuit to develop a representative D.-C. signal to be applied to appropriate indicators. In the systems heretofore known, correction of the output data discriminators is effected by varying the widths of the pulses in such outputs by use of signals corresponding to the changes in frequency of the reference signal. Where extremely high accuracy is required for the output of such a discriminator, highly intricate refinements must be incorporated in the discriminators to insure that the precise compensation is obtained. Such refinements necessarily lead to discriminator apparatus that are larger, heavier and more costly in order to achieve the desired accuracy. In many situations, space and weight are at a premium, so that such refinements prevent the apparatus from satisfying the desired space and weight requirements. Furthermore, the greater the number and complexity of the refinements, the greater are the number of points of possible circuit failure. Hence, such refined systems require an undesirable amount of care and attention.

It is an object of our invention to provide a unique frequency discriminator system that overcomes the above and other disadvantages of the prior art.

It is another object of our invention to provide a frequency discriminator system of the pulse averaging type with which distorted signals applied thereto are compensated accurately without varying the width of pulses developed thereby.

A further object of our invention is to provide a frequency discriminator system that is only a small fraction of the size, weight and cost of highly accurate prior art systems, and which achieves the accuracy of prior art systems without the attendant disadvantages.

A still further object of our invention is to provide a frequency discriminator system and circuits that comprise a minimum number of component parts of simple design and rugged construction, capable of highly reliable operation over a long operating life with a minimum of care and attention.

The above and other objects and advantages of this invention will become apparent from the following description taken in conjunction with the accompanying drawings of an illustrative embodiment thereof, in which:

FIGURE 1 is a block diagram of a portion of a multiple channel discriminator system, showing the data discriminator channel incorporating a compensation network to receive signals from a correction discriminator channel, and showing the system arrangement of the data discriminator channel for varying the height and envelope of each pulse developed therein in response to the coincident signal from the compensation network;

FIGURE 2a is a plot of the waveform of one signal component applied to the input of a discriminator channel, and showing an undistorted waveform superimposed thereon to illustrate the frequency changes that took place in the recording and reproduction of the signals;

FIGURE 2b is a plot of the square wave voltage developed in the limiter amplifier in the discriminator channel;

FIGURE 2c is a plot of the differentiated voltage obtained from the square wave of FIGURE 2b;

FIGURE 2d is a plot of the constant width pulses derived from the differentiated waveform of FIGURE 2c;

FIGURE 2e is a plot of the varying D.-C. voltages from the correction network and the compensation network;

FIGURE 2f is a plot of the pulses developed by the pulse height envelope control network to follow the contours of the coincident portions of the voltage from the compensation network; and FIGURE 3 is a schematic diagram of the transistor circuits forming the constant width pulse network, the compensation network, and the pulse height envelope control network.

Figure 1:
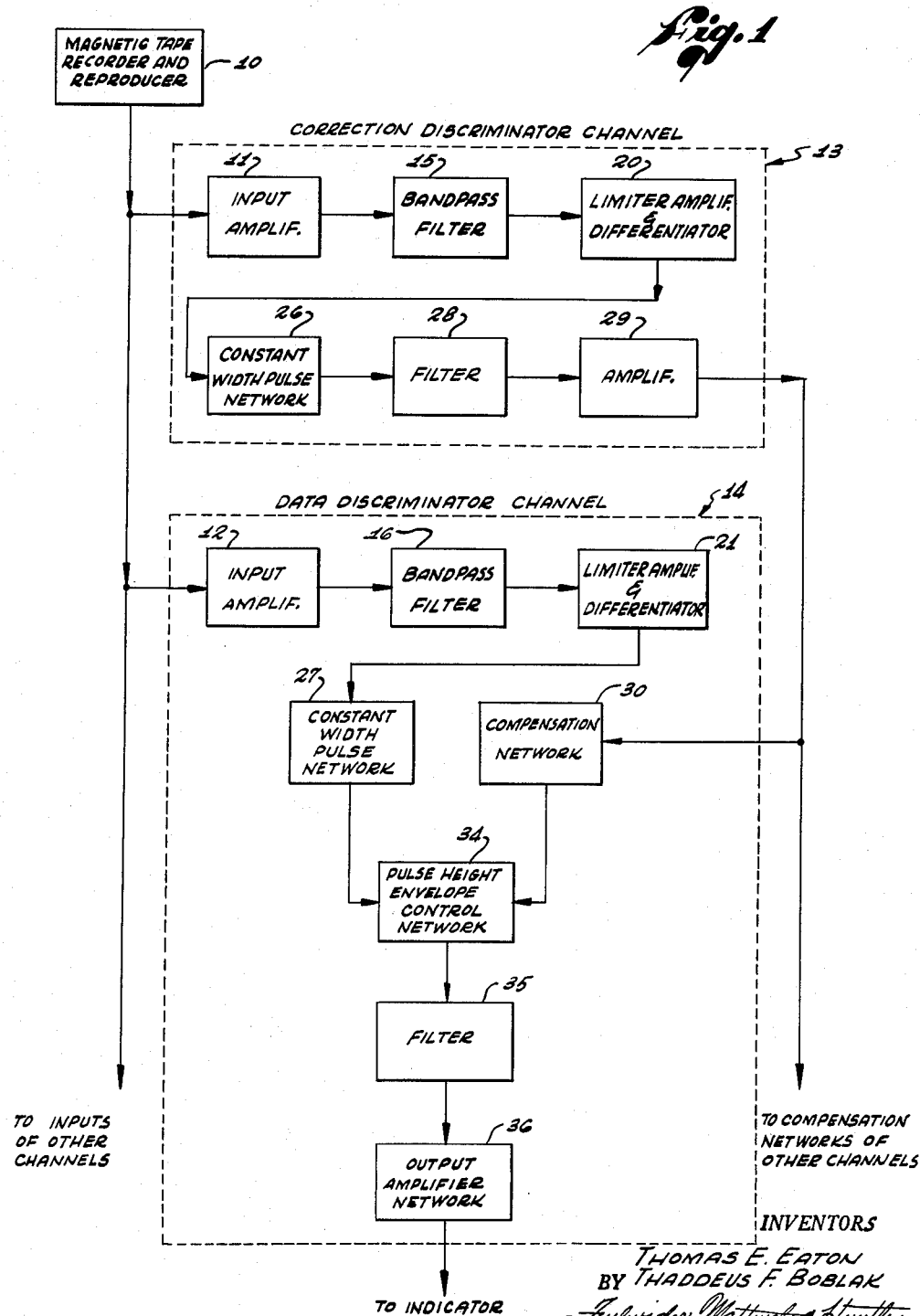

Referring to FIGURE 1, a magnetic tape recorder and reproducer 10 is shown that is coupled to input amplifiers 11, 12 of respective discriminator channels 13, 14, designated respectively as a correction discriminator channel and a data discriminator channel. The signals originally applied to the recorder are a composite of two or more signals, one of which is an unmodulated reference signal of fixed frequency, and the remaining signals are information signals.

As previously indicated, the information signals are constituted in a frequency discriminator system of a plurality of spaced subcarrier frequencies that are frequency modulated in accordance with respective items of information. Each of the subcarrier frequencies falls in a band having a predetermined center frequency, wherein information superimposed on the carrier may cause the frequency thereof to vary between fixed upper and lower limits about the center frequency.

As has also been indicated, the magnetic tape apparatus, both during the recording process and the reproducing process, subjects a recorded signal to frequency shifts. Thus, all of the frequency components in the output of the reproducer 10 are similarly distorted.

Each of the discriminator channels in the system is adapted to handle the component of the composite reproduced signal that is in a prescribed frequency band. To this end, the correction channel 13 is provided with a bandpass filter 15 coupled to the output of the amplifier 11, such bandpass filter 15 being adapted to pass the signal component of the reference frequency, e.g., 100 kc. (kilocycles) per second. In the data discriminator channel 14, a similar bandpass filter 16 is coupled to the output of the amplifier 12, for passing frequency components within a prescribed information band, e.g., a band having a center frequency of 960 c.p.s. (cycles per second), with upper and lower limits, respectively, of 1,032 c.p.s. and 888 c.p.s.

In each of the channels 13, 14, the signals for the bandpass filters 15, 16 are processed so as to obtain pulses of constant height and width, but which vary in spacing in accordance with variations in frequency of the signal components. Referring to FIGURES 2a–2d, along with FIGURE 1, there is shown a sinusoidal voltage 18 (FIGURE 2a) representing the waveform of the voltage appearing in the output of either of the bandpass filters 15, 16. It will be appreciated that the frequencies of these voltages will be different for the different channels; however, percentage variations in the frequencies of these voltages is the same.

Also shown in FIGURE 2a is a dotted sinusoidal voltage 19 that corresponds to the waveform initially applied to the tape recorder. For purposes of convenience, the dotted waveform 19 is shown to be of a constant frequency, which may represent an unmodulated subcarrier in a pass band, the reference frequency, or a frequency within a pass band that is higher or lower than the center frequency by an amount depending upon the modulation of the subcarrier.

The voltages from the bandpass filters 15, 16 are fed into respective limiter amplifier and differentiator networks 20, 21, in which the voltage 18 is successively amplified and clipped, to provide a square wave, and then differentiated. FIGURE 2b illustrates the square wave voltage 22, and in FIGURE 2c there is shown the voltage spikes 23 developed upon the occurrences of the leading and trailing edges of the fluctuations of the square wave voltage 22.

FIGURE 2d illustrates the constant width pulses 24 above mentioned. To obtain the voltage pulses 24, the outputs of the limiter amplifier and differentiator networks 20, 21 are applied to respective constant width pulse networks 26, 27. The pulse networks develop pulses only upon the occurrence of alternate spikes of the differentiated voltage 23. In the voltage waveforms illustrated, it is noted that a pulse 24 occurs at the beginning of each cycle of the sinusoidal voltage 18.

At this point, it should be noted that the voltage 18 is variable in frequency from that of the voltage 19 from which the voltage 18 was developed in the output of the reproducer 10. Comparing the waveforms 18, 19, it will be seen that the voltage 18 is a higher in frequency at the left-hand side of the chart, approximately the same in frequency at about the center of the chart, and lower in frequency at the right-hand side of the chart. Correspondingly, as will be noted in FIGURE 2d, the ratio of the pulse width to the pulse spacing varies, so that the number of pulses per unit time is greater at frequencies above the desired frequency, and less at frequencies lower than the desired frequency. This means, of course, that in order to compensate for the undesired effects on the signal recorded and reproduced, it is necessary to normalize the effects of the number of pulses that varies with respect to those corresponding to the desired frequency.

To obtain the desired compensation, we utilize the correction channel 13 to develop a D.-C. correction signal that fluctuates in accordance with the frequency variations of the signal processed therein, and which is of a polarity corresponding to whether the signal is above or below the reference frequency. To this end, a low pass filter 28 is provided to obtain the fluctuating D.-C. voltage mentioned from the pulses in the output of the pulse network 26. The voltage in the output of the filter 28 is applied, as through an amplifier 29, to a compensation network 30 in the data discriminator channel 14. FIGURE 2e illustrates the voltage waveforms 31, 32 that appear in the outputs of the amplifier 29 and the compensation network 30, respectively. As noted, the compensation network 30 effectively reverses the polarity of the D.-C. voltage from the correction channel.

In the data discriminator channel 14, the outputs of the pulse network 27 and the compensation network 30 are utilized to develop pulses that vary in height and envelope in accordance with the variations in the waveform of the voltage 32 from the compensation network 30. To this end, the outputs of the pulse network 27 and the compensation network 30 are shown to be applied to a pulse height envelope control network 34, the output of which is applied through a filter 35 and an output amplifier network 36 to a suitable indicator (not shown).

Referring to FIGURES 2d–2f along with FIGURE 1, the pulse height envelope control network 34 responds to the pulses 24 from the pulse network 27 to develop pulses 38 that coincide in time with the pulses 24, and are of the same width and spacing. However, the control network 34 is arranged so that it has the capability of producing such pulses of a maximum height, $h$, but to produce pulses less than the total height, e.g., $0.75h$ when the output voltage 32 from the compensation network 30 is at a predetermined level, such as zero.

The pulses 24 from the pulse network 27 determine the periods during which the network 34 develops output pulses, and such network 34 responds to the D.-C. voltage 32 from the compensation network 30 to develop pulses 38 that vary in height with respect to the level $0.75h$. The voltage 32 is shown in FIGURE 2f to be superimposed at the level $0.75h$, and illustrates that when the voltage 32 is negative, the pulses 38 occurring during such negative excursion are reduced in height, and those pulses 38 occurring during the period when the voltage 32 is positive are increased in height. Furthermore, the envelopes of the pulses 38 between their leading and trailing edges vary in accordance with the voltage waveform 32. In this manner, although the widths of the pulses 38 remain the same, and the ratios of pulse width to pulse spacing remain the same as for the pulses 24, the variations in the heights of the contoured pulses 38 insure that their average value will differ from the average of the pulses 24 by an amount determined by the correction voltage 31, i.e., the average of the pulses 38 corresponds to the information signal without the errors introduced by the tape recorder and reproducer 10. Accordingly, upon the pulses 38 being filtered by the filter 35, the amplifier 36 develops an output voltage that corresponds accurately, in polarity and magnitude, to the modulation on the subcarrier as originally received, i.e., as applied to the recorder.

FIGURE 3 illustrates unique circuits of our invention for accomplishing the desired results. As shown, the constant width pulse network 27 includes an amplifier formed of an N-P-N transistor 40 arranged to have the differentiated voltage (the voltage 23 in FIGURE 2c) applied to its base electrode 41. The emitter-collector current path of the transistor 40 is connected across the terminals of a voltage source, with the collector electrode 42 resistively coupled, as through a resistor 43, to the positive terminal of the source.

The amplifier transistor 40 is coupled to an emitter follower that includes a P-N-P transistor 45 having its base electrode 46 coupled to the collector 42 of the transistor 40. The emitter-collector current path of the transistor 45, like that of the transistor 40, is connected across the terminals of the voltage source, with the exception that, since the transistor 45 is a P-N-P type, the emitter electrode 47 of the transistor 45 is resistively connected, as through a resistor 48, to the positive terminal of the source. The resistor 48 provides an impedance across which to develop a voltage when the transistor 45 conducts.

The transistor 45 is arranged to feed into an amplifier comprising an N-P-N transistor 50 through an RC network composed of a resistor 51 and capacitor 52. As shown, the resistor 51 and the capacitor 52 are connected between the positive terminal of the voltage source and the emitter 47 of the transistor 45, and the base electrode 53 of the transistor 50 is connected to the junction 54 of the resistor 51 and the capacitor 52.

The transistor 50 is coupled to an emitter follower that includes a P-N-P transistor 55, and these are connected together in the same manner as the transistors 40, 45. Thus, the collector 56 of the transistor 50 and the emitter 57 of the transistor 55 are coupled through respective resistors 58, 59 to the positive terminal of the source, and the base electrode 60 of the transistor 55 is connected to the collector electrode 56 of the transistor 50. Finally, the pulse network 27 includes a resistive feedback connection, shown as a resistor 61, connected between the emitter 57 of the transistor 55 and the base electrode 41 of the transistor 40.

With the transistors 40, 45, 50, 55 arranged as above described, the transistors 40, 45 are nonconductive and the transistors 50, 55 are conducting in the absence of a signal. Further, the transistors 50, 55 are heavily conducting at saturation in the absence of an input. Under these conditions, the emitter 57 of the transistor 55 is effectively at negative potential, which is reflected through the feedback resistor 61 to maintain the base electrode 41 of the transistor 40 sufficiently negative to prevent its conduction. Still further, it will be seen that this arrangement is one in which negative voltages applied to the base electrode 41 of the transistor 40, i.e., the negative excursions of the differentiated voltage 23 of FIGURE 2c, will be ineffective to render this transistor conductive.

When a positive spike of the differentiated voltage 23 is applied to the base electrode 41 of the transistor 40, the magnitude of the spike is sufficient to establish the requisite emitter-base potential difference to effect conduction of the transistor 40. Correspondingly, the transistor 45, which is one characterized by a high input impedance and a low output impedance, has its base electrode 46 switched from a positive to a negative potential, thereby to establish the requisite emitter-base potential difference to effect its conduction.

Conduction of the transistor 45 results in the voltage spike being transferred through the capacitor 52 to raise the potential of the base 53 of the transistor 50, thereby to cut the transistor 50 off. Thereupon, the transistor 55 is also cut off.

The above-described conditions, wherein the transistors 40, 45 are rendered conducting, and the transistors 50, 55 are rendered nonconducting, continue beyond the duration of the positive voltage spike applied to the base 41 of the transistor 40. The maintenance of these conditions for a greater period is effected through the feedback resistor 61 and the RC network 51, 52. As will be seen, when the transistor 55 is cut off, the emitter 57 thereof is immediately placed at a positive potential, and such potential is reflected through the resistor 61 at the base 41 of the transistor 40. Such reflected potential for a conducting N-P-N transistor is effective to maintain its conduction. Under such continued operating conditions, the time constant provided by the RC network 51, 52 is sufficient so that at predetermined instant after the initiation of the voltage spike, the charge on the capacitor 52 falls to a value to permit the transistor 50 to again conduct. Thereupon the transistor 55 conducts, whereupon the voltage on the emitter 57 thereof, and hence on the base 41 of the transistor 40, is reduced. Accordingly, conduction of the transistor 40 ceases, thereby cutting off the transistor 45.

The above-described operation of the pulse network 27 results in a voltage pulse of fixed duration at the emitter 57 of the transistor 55, which is the output connection from the pulse network 27. As will be seen, when the transistor 55 is cut off, the potential of the emitter 57 becomes positive, and remains positive until, through the operation of the RC network 51, 52, the transistor 55 is again rendered conducting, thereby to lower the potential of the emitter 57. Thus, each of the pulses 24 (FIGURE 2d) is of the same magnitude and duration.

As previously indicated, the compensation network 30 functions to invert the varying D.-C. signal from the correction channel. Referring to FIGURE 3, the compensation network 30 comprises a pair of P-N-P transistors 65, 66. The transistors 65, 66 are arranged to form a D.-C. operational amplifier, and to this end the transistors 65, 66 have their collectors connected to a point of reference or ground potential. Also, the collector 67 of the transistor 65, besides being connected to ground through a resistor 68, is directly connected to the base electrode 69 of the transistor 66, and the emitter 70 of the transistor 66 is coupled through a resistor 71 to the base 72 of the transistor 65. The emitter 70 of the transistor 66 is connected through a load resistor 74 to the positive terminal of the source, and the emitter 75 of the transistor 65 is directly connected to the positive terminal.

The base electrode 72 of the transistor 65 is effectively clamped at a predetermined potential, and to this end we provide a resistor 76 and a Zener diode 77 in series across the terminals of the voltage source, and a resistor 78 connected between the diode 70 and the base electrode 72 of the transistor 65. The diode 77 functions in a conventional manner to change its degree of conduction so that the voltage at the junction 79 between the resistor 78 and the diode 77 remains constant.

Correction voltages from the correction channel are shown applied to the base electrode 72 of the transistor 65 through an input resistor 80. The transistors 65, 66 are arranged to be normally conducting at about the middle of their operating range in the presence of a zero correction signal. Under these conditions, the circuit parameters are arranged so that the voltages at the emitter 70 of the transistor 66 and the junction 79 of the Zener diode 77 and the resistor 78 are equal in magnitude but opposite in polarity. For example, the quiescent operating condition of the transistors may be such that the voltage at the emitter 70 of the transistor 66 is 5 volts positive, i.e., +5 v., and the voltage at the junction 70 is —5 v. Due to the connections of the resistors 71 and 78 from the base 72 to the emitter 70 and to the junction 79, the quiescent voltage on the base electrode 72 is zero. Also under these conditions, the voltage at the collector 67 of the transistor 65 is the same as that at the junction 79, i.e., +5 v.

Should the voltage from the correction channel change, the voltage on the base electrode 72 of the transistor 65 tends to follow the change, and such change is reflected through the transistors. For example, if the correction voltage is a positive voltage of 1 volt, the voltage on the collector emitter 67 of the transistor 65 increases by 1 volt, and this is reflected as a decrease of 1 volt at the emitter 70 of the transistor 66. Under the quescent conditions above assumed, this means that the voltage at the emitter 70 decreases from +5 v. to +4 v. In this manner, the decrease of 1 volt on the emitter 70 of the transistor 66 is reflected through the resistor 71 at the base 72 of the transistor 65, thereby to maintain the voltage at such base 72 at zero.

As above explained, the pulse height envelope control network 34 responds to the inverted correction voltage developed by the compensation network 30, and to the pulses from the pulse network 27, to develop pulses of varying magnitudes. In the circuit of FIGURE 3, this is accomplished with a network formed of a pair of N-P-N transistors 82, 83 connected as emitter followers, wherein the emitter 84 of the transistor 82 is connected to the base electrode 85 of the transistor 83, and the emitter 86 of the transistor 83 has an output connection 87 through which to apply output pulses to the filter 35 of FIGURE 1. As shown, both the emitters 84, 86 are resistively coupled, as through resistors 88, 89, to the negative terminal of the voltage source.

The transistor 82 constitutes the input stage for the pulse height envelope control network 34, and is arranged so that its base electrode 90 is coupled, as through a resistor 91, to the emitter 57 of the output stage of the pulse network 27, and its collector electrode 92 is coupled to the emitter 70 of the output stage of the compensation network 30.

The pulse height envelope control network 34 is arranged so that, in the absence of a correction signal, it develops voltage pulses of approximately half the magnitude that it is capable of producing, e.g., voltage pulses of 5 volts in the foregoing example. To this end, the transistors 82, 83 are adapted to be cut off during intervals between pulses, and to be rendered conducting during the occurrence of a pulse to a degree determined by the magnitude of the voltage from the compensation network. As will be seen, during the occurrence of each pulse applied to the base 90 of the transistor 82, the transistor 82 conducts, and its emitter 84 is placed at the potential of the base 90. The voltage on the base 90 and emitter 84 is limited by the voltage on the collector 92.

The voltage on the emitter 84 of the transistor 82 also is applied whereby the transistor 83 is rendered conductive. Hence the emitter 86 of the transistor 83 has the same voltage applied thereto, and such voltage is fed through the output connection 87 to the filter.

In both transistors 82, 83, the emitter voltages may extend to that of the positive terminal of the source. Such potential would be reached upon the signal from the compensation network causing the voltage at the collector 92 of the transistor 82 to rise to the potential of the positive terminal. Similarly, such emitters 84, 86 may move to zero potential, as the result of the voltage from the compensation network lowering the voltage on the collector 92 to zero. Thus, if the positive and negative terminals of the source are 10 v. above and below zero (see FIGURE 2f), and the emitter 70 of the transistor 66 is at +5 v. (0.75h) in the absence of a correction signal, then the output pulses 38 may rise as much as 5 v. to +10 v., and be decreased as much as 5 v. to 0 v.

Since positive correction voltages result from frequencies higher than the reference frequency, and negative correction voltages result from frequencies below the reference frequency, the corresponding decreases and increases in the magnitudes of the output pulses from the pulse height envelope control network 34 will be seen to effectively and accurately compensate for the spurious frequency variations Our unique system and circuit arrangement has been found suitable for building a discriminator channel that provides the accuracy and reliability of the best prior art systems, but which occupies only a fraction of the space of such prior art systems. By way of example, an 18-channel system in accordance with our invention occupies less than one cubic foot of space, and consumes so little power as to require no cooling Contrariwise, the better 18-channel systems of the prior art occupy from ten to twenty cubic feet of space and consume so much power as to require special cooling apparatus, including air conditioning.

A primary reason for the marked miniaturization of our system is that it eliminates the problems—and associated complex control apparatus—of pulse-width variation systems. In such systems, it should be noted that as frequency (and pulses) increases, the time between the end and beginning of adjacent pulses is quite short. Allowing for rise and fall times for the leading and trailing edges of these pulses, it will be seen that pulse-width variations of extremely small character must be dealt with. Further, the closer together are such pulses, and the greater the frequency variations to be compensated for, the smaller is the tolerable variation in the widths of the pulses—all of which places a premium on highly refined, extremely fast acting networks for proper system operation. In our system, however, pulse height variations can be made to as great a degree as desired or needed, because variations in pulse height do not affect pulse width so as to require complex, sensitive networks.

From the foregoing, it will be apparent that although we have illustrated and described particular embodiments of our invention, it will be apparent that various modifications can be made therein without departing from the spirit and scope of our invention. For example, it will be apparent that the data discriminator channel 14 can be used without the correction channel 13 and the compensation network 30. This unique discriminator channel is suitable for use to develop indications directly of modulation of a subcarrier, e.g., wherein indications of the information signal are to be provided instantly upon receipt. Also, the circuits disclosed herein are themselves unique, and may be used in other systems, e.g., where it is desired to use information represented by the repetition rate of output pulses (frequency), pulse height (voltage), and pulse width (resistance of the RC network 51, 52). Accordingly, we do not intend that our invention be limited, except as by the appended claims.

We claim:

1. In a system for deriving information from signals reproduced from a composite signal made up of one signal of fixed frequency and at least one other signal of a carrier frequency that is frequency modulated by an information source, and wherein the components of the composite signal are variable in frequency from the fixed frequency signal and the modulated signal, means to process such components and obtain the information reflected in the frequency modulation, comprising: means to develop a varying D.-C. voltage that varies inversely as the frequency variations of the one signal relative to the fixed frequency; means to develop a pulse during each cycle of the other signal, each pulse being of the same duration and amplitude; and means to vary the amplitude of each pulse relative to a predetermined reference level by an amount corresponding to the magnitude of the coincident portion of said D.-C. voltage.

2. In combination with a source of signals made up of one unmodulated signal of fixed frequency and at least one other signal of a different frequency that is frequency modulated, and wherein both signals contain undesired frequency variations, a system for deriving an output signal corresponding to the modulation on the signal of different frequency comprising: pulse developing means to develop a pulse during each cycle of the other signal, each pulse being of the same duration and the same height; means to develop a varying D.-C. voltage that varies inversely in magnitude as the frequency variations of the one signal relative to the fixed frequency; means to vary the height of each pulse relative to a predetermined reference level by amounts corresponding to the magnitude fluctuations of the coincident portions of said D.-C. voltage; and means responsive to the varying height pulses to develop a second D.-C. voltage representing the average thereof.

3. A system as defined in claim 2, wherein said pulse developing means includes means to develop pulses of fixed magnitude and duration; and variable pulse height developing means responsive to the pulses of the same amplitude and duration to develop the pulses that are of the same duration, but variable in height.

4. A system as defined in claim 3, wherein said D.-C. voltage developing means includes means responsive to the one signal to develop a pulse of predetermined height and duration during each cycle of the one signal; and means to develop a D.-C. voltage from the pulses derived from the one signal.

5. A system as defined in claim 4, including: means to invert said D.-C. voltage; and means to apply said inverted D.-C. voltage to said variable pulse height developing means, thereby to obtain pulses that vary inversely in height as the frequency of the other signal.

6. A frequency discriminator system comprising: respective input circuits to pass components of respective frequencies in a composite signal applied thereto, wherein one component is an unmodulated signal having spurious frequency shifts, and the other component is a frequency modulated signal having a similar percentage of spurious frequency shifts; respective means in said input circuits to develop a pulse of fixed height and width during each cycle of the associated component; D.-C. voltage developing means responsive to pulses derived from the unmodulated component to develop a D.-C. voltage that varies inversely as the frequency shifts of the unmodulated component; variable pulse height developing means responsive to pulses derived from the modulated component to develop pulses of the same duration but variable in height; and means responsive to the D.-C. voltage to vary the heights of said last-named pulses in accordance with the magnitudes of the coincident portions of said D.-C. voltage.

7. A system as defined in claim 6, including means to invert said D.-C. voltage; and means to apply the inverted D.-C. voltage to said variable pulse height developing means, thereby to obtain pulses that vary inversely in height as the frequency of the other signal.

8. In combination: a pair of voltage terminals to be placed at respective potentials; a resistor and a Zener diode connected in series across said terminals; a first transistor having a base connection to the junction of said resistor and diode, and having an emitter-collector path connected between one of said terminals and a point of reference potential; a second transistor having a base connection to the emitter-collector path of said first transistor, and an emitter-collector path connected between said one terminal and said point of reference potential; a resistor connected between the emitter-collector path of said second transistor and the base of said first transistor; an input resistor connected to the base of said first transistor; a first transistor amplifier; a first emitter follower coupled to said first amplifier; a second transistor amplifier; a second emitter follower coupler to said second amplifier; a resistance-capacitance network connected between said first emitter follower and said second amplifier; a resistive feedback connection between said second emitter follower and said first amplifier; means connecting said amplifiers and emitter followers across said terminals; a pair of transistors connected as emitter followers, one having an emitter-collector path connected between said terminals, and the other having an emitter-collector path connected between the other of said terminals and the emitter-collector path of said second transistor; and a resistive connection between said second emitter follower and said other emitter follower of said pair of transistors.

9. The combination defined in claim 8, wherein said pair of emitter followers and said first and second transistor amplifiers are one transistor type, and the remaining emitter followers and said first and second transistors are another transistor type.

References Cited in the file of this patent

UNITED STATES PATENTS 2,892,103    Scarbrough _____ June 23, 1959
2,900,532    Barnes _____ Aug. 18, 1959